(12) United States Patent
Byers et al.

(10) Patent No.: US 8,910,133 B2
(45) Date of Patent: Dec. 9, 2014

(54) LIBRARY CONFORMITY CHECKER

(75) Inventors: Richard Byers, Bellevue, WA (US); Frank Peschel-Gallee, Kirkland, WA (US); Raja Krishnaswamy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1150 days.

(21) Appl. No.: 12/794,782

(22) Filed: Jun. 7, 2010

(65) Prior Publication Data
US 2011/0302564 A1 Dec. 8, 2011

(51) Int. Cl.
*G06F 9/45* (2006.01)
*G06F 9/44* (2006.01)

(52) U.S. Cl.
CPC ... *G06F 8/36* (2013.01); *G06F 8/75* (2013.01)
USPC .......................................................... 717/145

(58) Field of Classification Search
USPC .......................................................... 717/146
See application file for complete search history.

(56) References Cited

U.S. PATENT DOCUMENTS

| | | | |
|---|---|---|---|
| 6,460,178 B1 * | 10/2002 | Chan et al. ..................... | 717/147 |
| 7,536,679 B1 * | 5/2009 | O'Connell et al. ............ | 717/126 |
| 7,627,865 B2 | 12/2009 | Muhlestein et al. | |
| 7,634,770 B2 * | 12/2009 | Roth ............................. | 717/170 |
| 2003/0110096 A1 | 6/2003 | Dathi | |
| 2006/0075389 A1 | 4/2006 | Itoh et al. | |
| 2006/0161768 A1 * | 7/2006 | Baissus et al. ................ | 713/152 |
| 2007/0150855 A1 | 6/2007 | Jeong | |
| 2007/0168960 A1 | 7/2007 | Carey et al. | |
| 2009/0164973 A1 | 6/2009 | Barnett et al. | |
| 2009/0204718 A1 * | 8/2009 | Lawton et al. ................ | 709/230 |
| 2009/0241091 A1 * | 9/2009 | Anlauff et al. ................ | 717/114 |
| 2010/0083240 A1 * | 4/2010 | Siman ............................ | 717/144 |
| 2010/0313182 A1 * | 12/2010 | Chen et al. .................... | 717/109 |

OTHER PUBLICATIONS

Heaton, Ryan., "Compiled Contract", Retrieved at << http://www.webcohesion.com/compiled_contract.html >>, Mar. 16, 2007, pp. 12.

Sjögren, Andreas., "A Method for Support for Design by Contract on the .NET platform", Retrieved at << www.idt.mdh.se/cbse-book/extended-reports/02_Extended_Report.pdf >>, Jul. 2002, pp. 12-20.

Dietrich, et al., "Components, Contracts and Vocabularies—Making Dynamic Component Assemblies more Predictable", Retrieved at << http://www.jot.fm/issues/issue_2009_11/article4.pdf >>, In Journal of Object Technology, vol. 8, No. 7, Nov.-Dec. 2009, pp. 13.

Fähndrich, et al., "Embedded Contract Languages", Retrieved at << http://research.microsoft.com/pubs/104989/cc.pdf >>, Mar. 2010, pp. 8.

Crocker, David., "Safe Object-Oriented Software: The Verified Design-By-Contract Paradigm", Retrieved at << http://www.eschertech.com/papers/safe_oo_software.pdf >>, Proceedings of the Twelfth Safety-Critical Systems Symposium, 2004, pp. 23.

* cited by examiner

*Primary Examiner* — Li B Zhen
*Assistant Examiner* — Sen Chen
(74) *Attorney, Agent, or Firm* — Kevin Sullivan; Kate Drakos; Micky Minhas

(57) ABSTRACT

A library management system may compare contracts between programming libraries to identify unions, intersections, and differences between libraries. The management system may have a contract analyzer that may remove the contract definition from an existing library to form a library contract. The library contract may be managed as a first class item within a programming environment, and may be used as a reference for comparing existing and new versions of the library. The library management system may create reference libraries for programmers to write applications using two or more intersecting libraries, among other uses.

20 Claims, 5 Drawing Sheets

LIBRARY CONFORMITY CHECKER

BACKGROUND

With many computer programming systems, libraries of routines may be distributed and used by many different programmers. The libraries may contain many operations that may be reused in many different settings. For example, a set of libraries may generate user interface components, perform file-related operations, or perform network communications. Programmers may use the libraries to create many different types of applications.

The libraries, sometimes known as assemblies, may evolve and change over time and different variations of the libraries may be formed for different hardware platforms or for different applications.

SUMMARY

A library management system may compare contracts between programming libraries to identify unions, intersections, and differences between libraries. The management system may have a contract analyzer that may extract the contract definition from an existing library to form a library contract. The library contract may be managed as a first class item within a programming environment, and may be used as a reference for comparing existing and new versions of the library. The library management system may create reference libraries for programmers to write applications using two or more intersecting libraries, among other uses.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
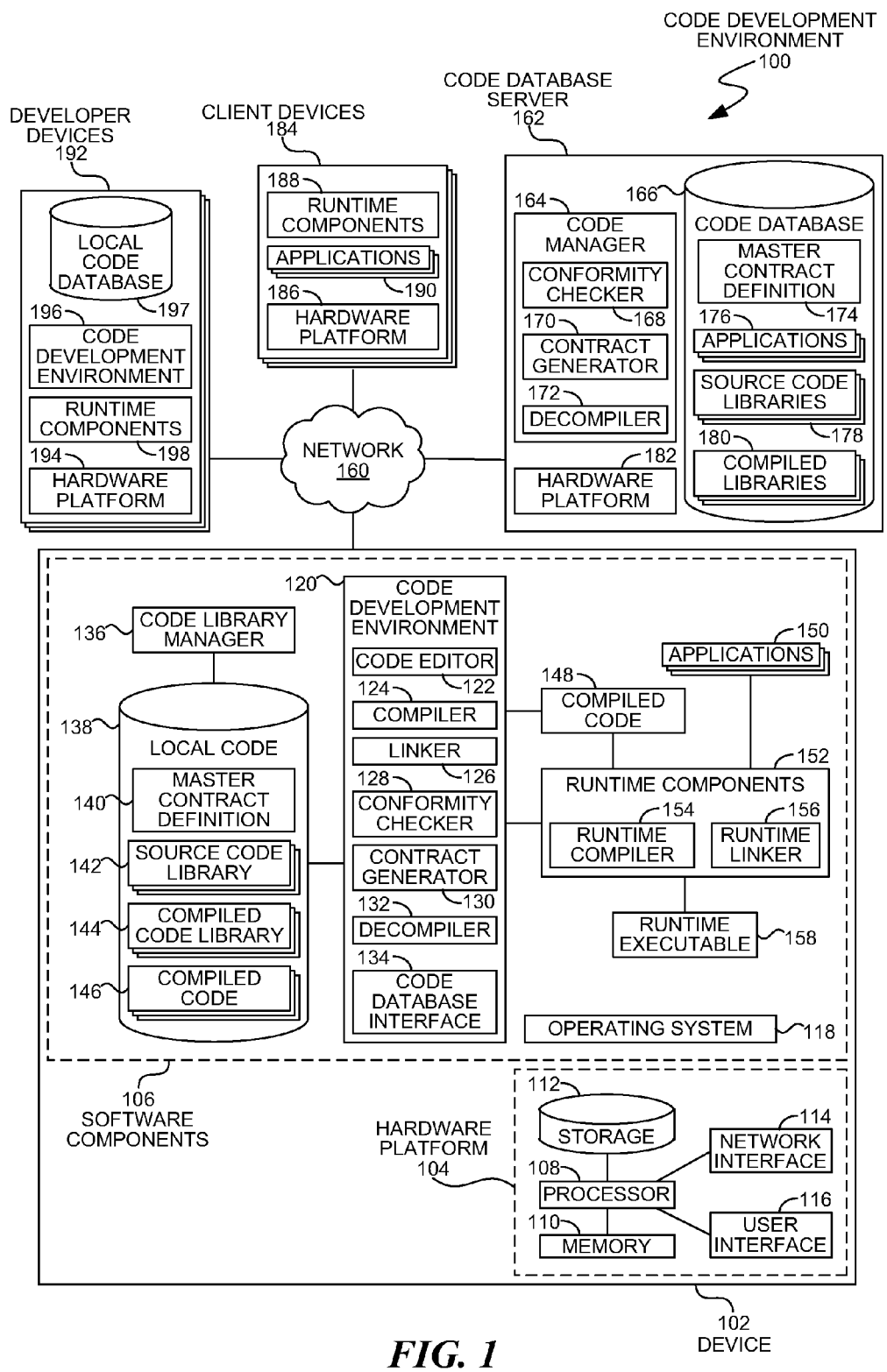
FIG. 1 is a diagram illustration of an embodiment showing a code development environment in a network setting.

Contracts for a library of routines may be managed as 'first class' items within a family of libraries. A conformity checker may perform various comparisons between actual libraries and the library contracts, as well as between different groups of contracts. The contracts may be managed as 'first class' items, where the contract definitions are defined and controlled during the library lifecycle, and where the contracts are used as master definitions to which the libraries are compared.

In many programming environments, libraries may contain many reusable routines that may be used by programmers to develop applications. For example, a library of routines may be developed for desktop or server computers that emphasize execution speed, while a second library may be developed for portable devices where the routines may be developed for energy efficiency. Both of the libraries may implement the same set of contracts, and may be used to develop applications on two different platforms.

Contracts for a library may define the input and output parameters for each routine in the library. Within a code management system, the contracts may be checked in and managed as first class items. First class items may be considered standards against which other programming operations may occur. In a typical embodiment, a set of contracts for a library may be defined prior to writing an implementation of the routines within the library. The contract definition may be negotiated and agreed upon prior to coding, and a conformity checker may verify that the coded library conforms to the contract definition.

The conformity checker may enable several different use scenarios. In embodiments with two or more versions of a library, the conformity checker may be used to identify an intersection between two libraries. The intersection may be useful to identify a subset of routines that are common to two libraries, such that when a program is limited to the intersection, the program may be compatible with two different libraries.

In another use scenario, a union of two versions of a library may be identified by a conformity checker. The union of two versions may identify the total set of routines, which may be used when identifying a new routine to ensure that the name of the new routine may not be previously defined in any library.

In still another use scenario, the conformity checker may determine a difference between a first library and a second library. In some cases, the library management system may attempt to enforce that there are no differences—such as when implementing a library that is supposed to conform precisely to a given contract. In other cases, a library management system may want to enforce that a library supports a superset of an existing contract. In which case the difference may be the 'customizations' or extra routines that are specific to the other library. The difference may be analyzed by a programmer to determine, for example, which calls to remove from their application so that the application may be ported to another library.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system with a conformity checker for libraries. Embodiment 100 is a simplified example of a network environment in which executable code may be developed, tested, and deployed.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a network environment in which executable code may be developed. Executable code may be written in any type of programming language and compiled or interpreted to create machine readable code, which is sometimes known as 'binary code' or 'executable code'. Throughout this specification and claims, references to 'code' may be to any type of software and may be preceded by a modifier, such as 'source code', 'compiled code', 'intermediate code', and 'executable code'.

The term 'source code' may be used to refer to computer software in its original written form. In many cases, 'source code' may be a human readable form and may be edited and manipulated by a programmer using an editor application. Examples of source code may be written in languages such as BASIC, C, COBAL, FORTRAN, or any of a host of other computer languages and versions of the languages.

In many cases, source code may be compiled into some form of compiled code. In one type of compiled code, the compiled code may be executable by a processor or low level interpreter. In another type of compiled code, the source code may be compiled into an intermediate language, which may be further compiled at runtime into a machine-readable executable format. Such a compiled code may be known as 'intermediate code', and may be a subset or specific instance of compiled code. Intermediate code may or may not be human readable. In some programming environments, tools may be available for manipulating and analyzing intermediate code.

The term 'executable code' may be programming code that may be directly executable by a processor. In some cases, a human programmer may write the executable code directly. However, it may be more common to use an interpreter or compiler to create executable code from source code.

A programming environment may have various tools that may assist a programmer or team of programmers to create computer applications from source code. Applications may be any form of software that performs a function. In some cases, applications may be very large, contain millions of lines of code, and may operate on multiple, interacting devices. In other cases, applications may be small, single function executables that operate on devices with very limited computing power.

The tools within a programming environment may include editors, compilers, and debuggers, as well as code management systems. The code management systems may allow a programmer to check in code into a central database to store and share code, as well as check out code to make changes and updates to the code. In many embodiments, such tools may allow large teams of programmers to work together to develop an application.

Libraries of routines may be used by programmers to store routines that may be reused in many different applications. For example, a group of programmers may write a set of applications that perform a set of common functions, such as accessing a central database. The programmers may create a library of database access routines that are shared amongst the various applications or within different groups working on the same application.

In some embodiments, a software manufacturer or consortium may create libraries that perform a set of common operations and may distribute the libraries to programmers that may be writing many different applications.

When a programmer uses a library, the programmer may create a call to a routine in the library from an application. For each routine in the library, a contract may define the data to be transmitted to the routine and the data returned from the routine, if any data are passed. The data may be defined using a data type, which may be a primitive data type such as a Boolean, integer, real number, string, or other primitive data type, or may be a complex data type that may be defined using the primitive data types.

At some point during the code development process, the programmer's application may be linked to the library. The linking may connect the programmer's code to the library in such a manner that, when executed, the application may call the routine in the library which will in turn be executed. Depending on the embodiment, the linking may occur at runtime, compile time, or at both runtime and compile time.

When linking to a library occurs at compile time, some embodiments may create a single executable code that includes the called routines in the library. In other embodiments, the linking may identify a library of executable routines that may be called during execution, creating two or more files that may be present and called during execution. In such an embodiment, the application executable code may be considerably smaller than the single executable code, as the library routines may be stored in a separate file.

When linking to a library occurs at runtime, some embodiments may represent the application as intermediate code. A runtime linker may analyze the application to determine which routines are called and may link the application code to an available library at runtime. The runtime linking scenario may allow for an application to be designed, tested, and released using one version of a library, but a different version of the library may be available at runtime.

In one such scenario, a programmer may create an application against a version of the library designed for a server computer. The library may contain routines designed for execution speed. The same application may be used on a portable, battery powered device and the original library may be substituted with a library designed for minimal power consumption. The libraries may have the same contracts that define the routines, but the implementation of the routines may be different.

The libraries may have different versions for different hardware platforms. For example, one version of a library may be written to operate with a desktop computer and a second version may be written to operate on a cellular telephone. Both versions may implement the same contract, but the routines themselves may be different to access the underlying hardware in a different manner. The libraries may also have different versions due to the evolution of libraries over time.

In order to manage the libraries, a conformity checker may compare libraries against one another. In many embodiments, the conformity checker may perform various set-based operations, which may include operations such as unions, differences, intersections, and other operations.

The conformity checker may analyze the contracts implemented by a library. The contracts may define the interface of the routines in the library, where the interface may be the portion of the set of routines that may be exposed to other executables. In many programming languages, the interface may include data types used to call the routine and data types that are returned from the routine.

The conformity checker may not analyze the implementation of a routine. For example, the conformity checker may compare two libraries: one library designed for a first hardware platform and a second library designed for a second hardware platform. The two libraries may be contain completely different routines, but may implement the same contracts.

In some use scenarios, the conformity checker may use a master contract definition, which may be a library that contains only contracts. Such a library may be used by the conformity checker to compare the master contract definition to various libraries to determine compliance with the master contract definition. Several use scenarios may be described in later portions of this specification.

The conformity checker may compare two or more libraries to ensure compatibility with each other. In such an operation, the routines from each library that share the same name may be analyzed to determine if the routines accept the same data types when called and return the same data types. When a discrepancy exists, the routines may not be interchangeable.

The compatibility analysis may determine if one version of a routine is forward or backward compatible with another version. For example, a first version of a routine may have one set of input parameters defined by data types. A second version of the same routine may have a superset of input parameters, where the extra parameters being optional parameters. In such a case, the first version may not be backwards compatible with the second version, but the second version may be forwards compatible with the first version. In some embodiments, the compatibility analysis may examine whether one version of a routine may accept a larger or smaller range of inputs, or may produce a larger or smaller range of outputs.

In the example, a program written using the first version of the library may operate properly when used with the second version of the library. However, programs written against the second version may not operate properly with the first version.

In some embodiments, the conformity checker may compare applications against a library or against a master contract definition. In such an embodiment, the conformity checker may analyze the application to identify each call to a routine in the library. The contract for the routine may be defined in the library.

Such a system may be used to check compatibility of an application to different libraries. For example, an application written against an older version of a library may be compared with a new version of the library to ensure compatibility. In another example, an application being written for a new library may be compared to an older library. Such a comparison may flag calls that are not backwards compatible to the older library and the programmer may modify the application accordingly.

In still another example, an application may be compared to two different versions of a library, where one library may be configured to operate on one hardware platform and another library may be configured to operate on a second hardware platform. The comparison may be used to verify that the application may be compatible with both libraries and may then be deployed on both hardware platforms.

The conformity checker may compare two or more libraries to determine a union of all routines. The result of such an analysis may include the contracts for every routine in all of the analyzed libraries. One use scenario for a union operation may be to enumerate all of the existing routines in two or more libraries. From the results of the union operation, a programmer may choose to rename a routine in a new library to prevent a conflict with a pre-existing routine.

The conformity checker may compare two or more libraries to identify the intersection of the libraries. The intersection may be used by a programmer to identify those routines that are common to both libraries. Applications that are limited to using the routines identified by the intersection operation may operate using either library.

The intersections may be useful in managing two development teams that are developing libraries. For example, a first development team may be developing a first library designed for handheld devices. The first library may have certain routines that are specific to the handheld device, such as user interface operations using specialized input mechanisms. A second development team may be developing a second library designed for server computers, and the second library may have a different set of routines that does not include the user interface operations included in the first library.

In the example, the comparison routine may generate an intersection between the two libraries to identify common routines, and enable applications to be written which run using either library. The common routines may be changed after receiving approval and agreement between the two development organizations. However, the routines that are specific to either library may be managed independently of the other development team.

The device 102 may represent a programming development station used by a programmer to develop applications. The device 102 may represent a typical computer device, such as a desktop computer or server computer, having hardware components 104 and software components 106. In some embodiments, the device 102 may be a laptop computer, netbook computer, tablet computer, mobile telephone, handheld personal digital assistant, game console, network appliance, or any other computing device.

The architecture illustrated for device 102 may represent a typical architecture with hardware and software components; however, other architectures may be used to implement some or all of the distributed database system.

The hardware components 104 may include a processor 108, random access memory 110, and nonvolatile storage 112. The hardware components 104 may also include a network interface 114 and a user interface 116.

The software components 106 may include an operating system 118 on which various applications may execute, including a code development environment 120.

The code development environment 120 is an example of a system for writing, compiling, and debugging source code. In other embodiments, one or more of the components listed in the code development environment 120 may be provided by another software component on the same device 102 or on a different device.

The code development environment 120 may include a code editor 122, in which a programmer may write source code, as well as a compiler 124 and linker 126. In many embodiments a code development environment 120 may include a virtualized operating system or other environment for executing compiled code.

In many code development environments, a code editor 122 may be integrated with a compiler 124 and linker 126. In such environments, a programmer may be able to write code using an editor window and then compile and link the code using the same application. Some such environments may have extensive debugging tools that may allow the programmer to execute the code within the editor window to step through the code, examine parameter values, and perform other functions.

A conformity checker 128 may be a component of a code development environment 120 that analyzes contracts associated with applications or libraries. The conformity checker 128 may be used to compare and analyze two, three, or more libraries against each other or an application, or perform analysis with a master contract definition.

The conformity checker 128 may be capable of analyzing application code and annotating the application code based on comparisons with different libraries. The conformity checker 128 may also analyze two or more libraries to ensure compatibility, identify intersections, determine differences, and other analyses that may be used to manage library development and deployment.

In some embodiments, the conformity checker 128 may be integrated into the code development environment 120. In such embodiments, the conformity checker 128 may generate flags or error messages that may be used to annotate application code and may be displayed in the code editor 122. In other embodiments, the conformity checker 128 may be a standalone application.

A contract generator 130 may be an application or function that analyzes an existing library and extracts the contract information from the library. The contract generator 130 may be used to define a master contract definition from an existing library. For example, the first version of a library may be published along with the master contract definition for the library. The contract generator 130 may analyze the library to keep the contract definition portion of a routine, but may strip out or remove the remaining portion of the routine, resulting in a library file that may contain only contract definitions.

The contract generator 130 may be used in some embodiments to prepare a library for analysis with the conformity checker 128. In such an embodiment, the contract generator 130 may analyze a library to keep the contract definitions and remove all other information. The resulting contract-only file may be analyzed by the conformity checker 128.

In some embodiments, the conformity checker 128 may perform analysis using source code, intermediate code, or executable code. In some cases, a decompiler 132 may be used to decompile code from executable code to intermediate code, or from intermediate code to source code for analysis.

Many code development environments 120 may have a code database interface 134. The code database interface 134 may interact with a local or remote code library to check in or check out code, share libraries and other routines, and other functions.

The device 102 may have a code library manager 136 that may manage a local code database 138. In some embodiments with a network accessible code database server 162, the code library manager 136 may communicate with the code database server 162 to download, upload, and synchronize code stored in the local code database 138.

The local code database 138 may include a master contract definition 140, source code libraries 142, compiled code libraries 144, and various other compiled code 146. The code stored in the local code database 138 may be code being developed by a programmer using the code development environment 120. In some embodiments, the local code database 138 may have one or more groups of code that are synchronized with a code database server 162.

The code development environment 120 may be used to generate compiled code 148 and various applications 150, which may be executed on the device 102. In some embodiments, various runtime components 152 may be used with intermediate code at runtime to create a runtime executable 158. The runtime components 152 may include a runtime compiler 154 and runtime linker 156. In such embodiments, the compiled code 148 or applications 150 may be intermediate code that may be further compiled and linked at runtime.

The device 102 may be connected to a network 160, which may have a code database server 162, among other devices. The network 160 may be a local area network, wide area network, the Internet, or combination of networks.

The code database server 162 may have a hardware platform 182, which may be similar to the hardware components 104 of device 102, on which a code manager 164 and code database 166 may operate.

The code manager 164 may include various routines that analyze libraries, applications, and other code. The code manager 164 may include a conformity checker 168, a contract generator 170, and a decompiler 172. The code manager 164 may have some of the same routines as are illustrated in the code development environment 120. In such embodiments, the routines may be executed remotely. For example, the device 102 may send a command to the code manger 164 on the code database server 162 to execute the conformity checker 168 against two or more libraries, applications, or master contract definitions.

The code database 166 may contain many of the same elements as the local code database 138, including master contract definitions 174, applications 176, source code libraries 178, and compiled libraries 180.

Various client devices 184 may execute the applications created by a programmer using the device 102. The client devices 184 may include runtime components 188 and various applications 190, and may execute on a hardware platform 186.

In a network environment where many programmers may jointly develop executable code, there may be several developer devices 192 that may be similar to the device 102. The developer devices 192 may include a hardware platform 194, a code development environment 196, local code database 197, and various runtime components 198. The developer devices 192 may interact with the code database server 162 in a similar manner as the device 102.

Figure 2:
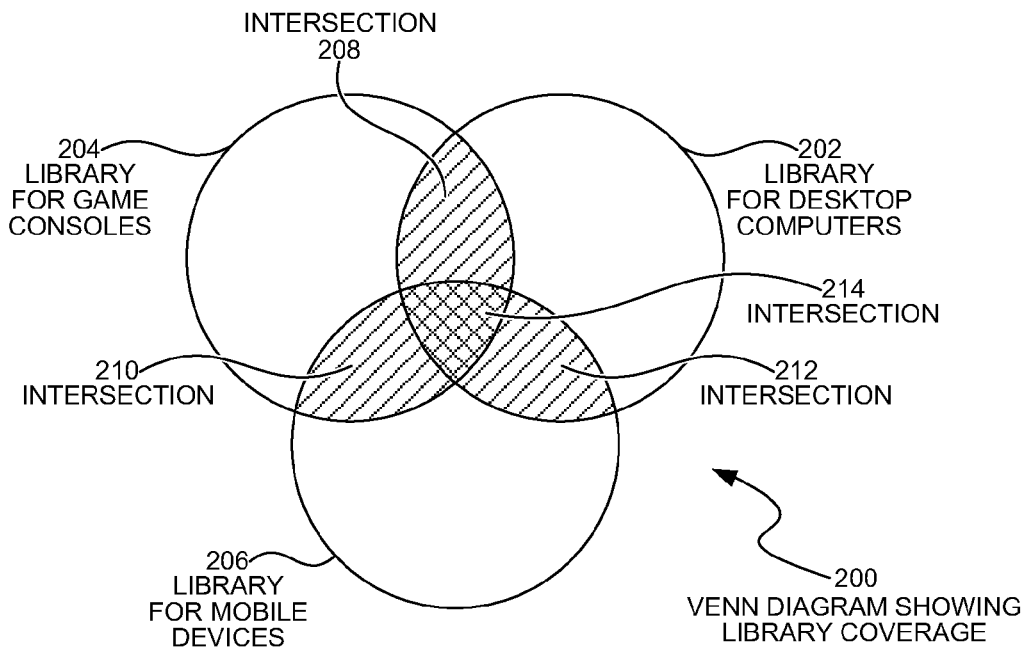
FIG. 2 is a diagram illustration of an example embodiment showing a Venn diagram showing library coverage.

FIG. 2 is a diagram illustration of an embodiment 200 showing coverage for several libraries. Embodiment 200 is a Venn diagram that may illustrate several use scenarios for a conformity checker.

The diagram of embodiment 200 shows a set of libraries that include a library 202 for desktop computers, a library 204 for game consoles, and a library 206 for mobile devices. The area of the various libraries illustrates routines within the libraries that perform various functions.

Between the various libraries are intersections 208, 210, and 212. Between all three libraries is the intersection 214. The intersections may represent those routines that are found in two or more libraries.

Routines that are found in two or more libraries may share the same contract or be part of the same contract. When an application calls only routines that are common to multiple libraries, the application may operate with either library, provided that the contracts for the routines comply with each library.

For example, the library designers may wish to enable a programmer to develop an application that may execute on both a desktop computer and a game console. The library designers may use a conformity checker to identify the intersection 208 and the routines within the intersection, and generate a new contract-only library that represents this intersection. A programmer may write their program against this contract-only library and be able to run their program in either of the two environments.

In another example, a programmer who wishes to develop an application that may use any of the libraries 202, 204, and 206 may limit the routine calls to only those routines in the intersection 214. In such a case, an application may be ported to one or more of the platforms by merely executing the application using the appropriate library.

Figure 3:
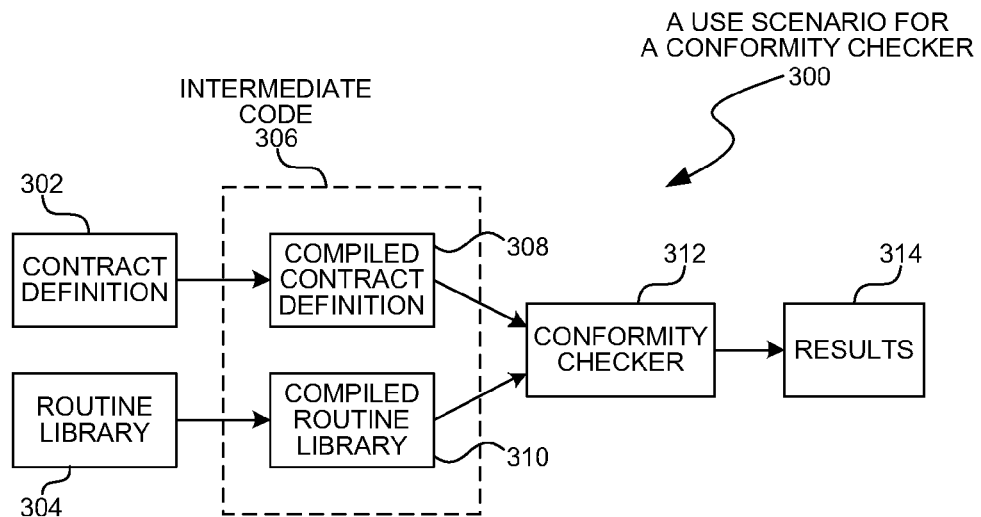
FIG. 3 is a diagram illustration of an example embodiment showing a use scenario for a conformity checker.

FIG. 3 is a diagram illustration of an embodiment 300 showing a use scenario for a conformity checker. Embodiment 300 illustrates how a contract definition may be compared to a runtime library to ensure that the library complies with the contract definition.

A contract definition 302 may contain the master definitions of contracts for a set of routines. The master definition may include a superset of routines that are a union of contracts from two or more libraries, may include an intersection of two or more libraries, or may have some other set of contracts.

A routine library 304 may represent a library that may be analyzed with respect to the master contract definition 302. In one use scenario, the routine library 304 may be certified to comply with the master contract definition 302 in embodiment 300.

The contract definition 302 may be compiled into intermediate code 306 to generate a compiled contract definition 308. Similarly, the routine library 304 may be compiled into intermediate code 306 to generate a compiled routine library 310. A conformity checker 312 may analyze the compiled contract definition 308 and compiled routine library 310 to generate results 314.

In some embodiments, the conformity checker 312 may analyze routines using intermediate code 306. Such embodiments may allow the input libraries or contract definitions to be expressed in different programming languages, but may be examined to comply with the same contracts though intermediate code.

An example of such a use scenario may be one version of a library written in BASIC and designed for a game console platform where a second version of the library may be written in C+ and designed for a mobile platform. The two libraries may be analyzed in intermediate code and found to be compliant with each other, even though the libraries are expressed in different programming languages.

The results 314 may identify those routines that are an intersection of the contract definition 302 and routine library 304, as well as those routines that are differences. The differences may be examined to determine whether or not the contracts for the two sources are exactly the same, whether one may implement a subset or superset of the other, whether there is only a common subset, or whether the contracts are completely independent.

Figure 4:
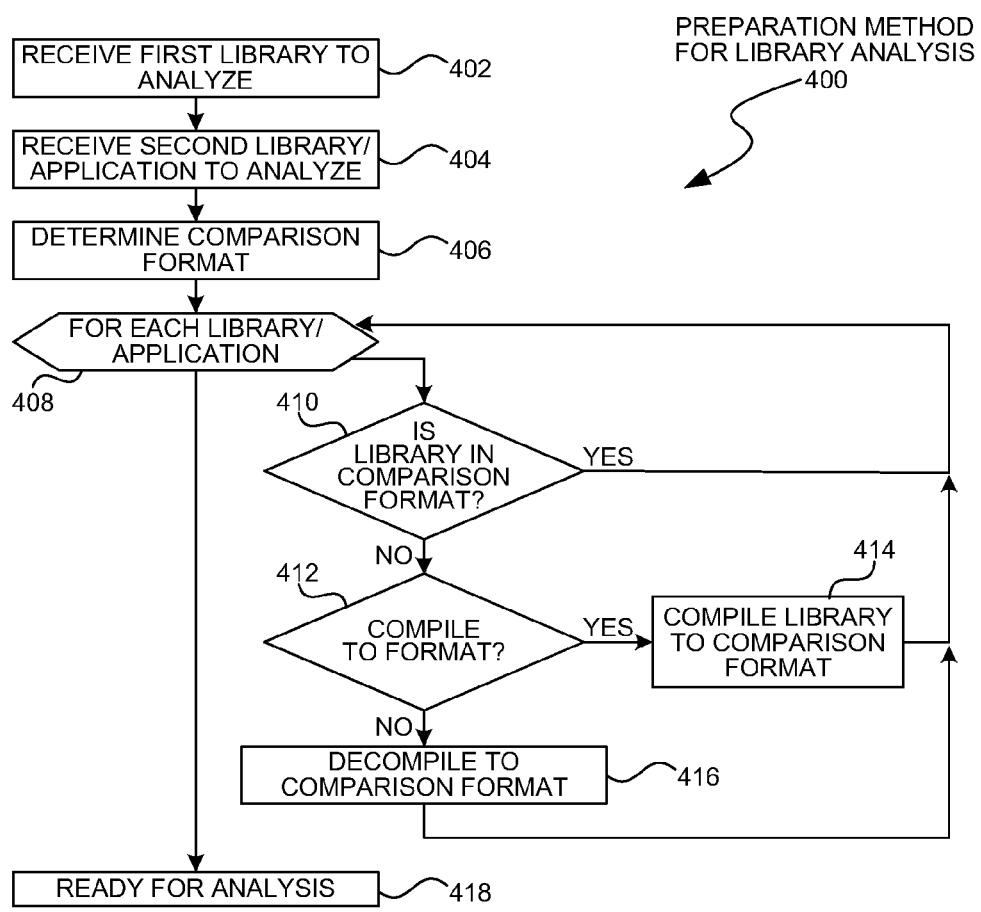
FIG. 4 is a flowchart illustration of an embodiment showing a method for preparing a library for analysis.

FIG. 4 is a flowchart illustration of an embodiment 400 showing a method for preparing a library for analysis. Embodiment 400 is a simplified example of a method that may place a library or application in a state for analysis by a conformity checker.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

In some embodiments, a conformity checker may examine libraries, contract definitions, and applications using executable code, intermediate code, or source code. Some embodiments may be capable of analyzing code in one or more of the various states.

In block 402, a first library may be received to analyze. A second library or application may be received in block 404.

In many embodiments, a master contract definition may be defined using the same syntax, language, and manner as a library, except that the master contract definition may not contain the underlying methods or procedures for the routines. In such embodiments, a master contract definition may be treated as any other library for the purposes of preparing and analyzing.

Similarly, applications may be prepared and analyzed using the same tools and processes as a library. For the purposes of preparation and analysis, the processes performed on a library may also be performed on an application or other set of code.

A comparison format may be determined in block 406. The comparison format may be the format that a conformity checker may perform an analysis. In embodiments where the conformity checker may be capable of analyzing code in various formats, such as executable code, intermediate code, or source code, the determination may be made in block 406 for a suitable comparison format.

Each library or application may be analyzed in block 408. For each library in block 408, if the library is already in the comparison format in block 410, the process may return to block 408. If the library is not in the comparison format in block 410 and the format can be created by compiling in block 412, the library may be compiled to the comparison format in block 414. If the library cannot be compiled to the format in block 412, the library may be decompiled in block 416 to achieve the comparison format.

After the process of block 408, the libraries are ready for analysis in block 418.

Figure 5:
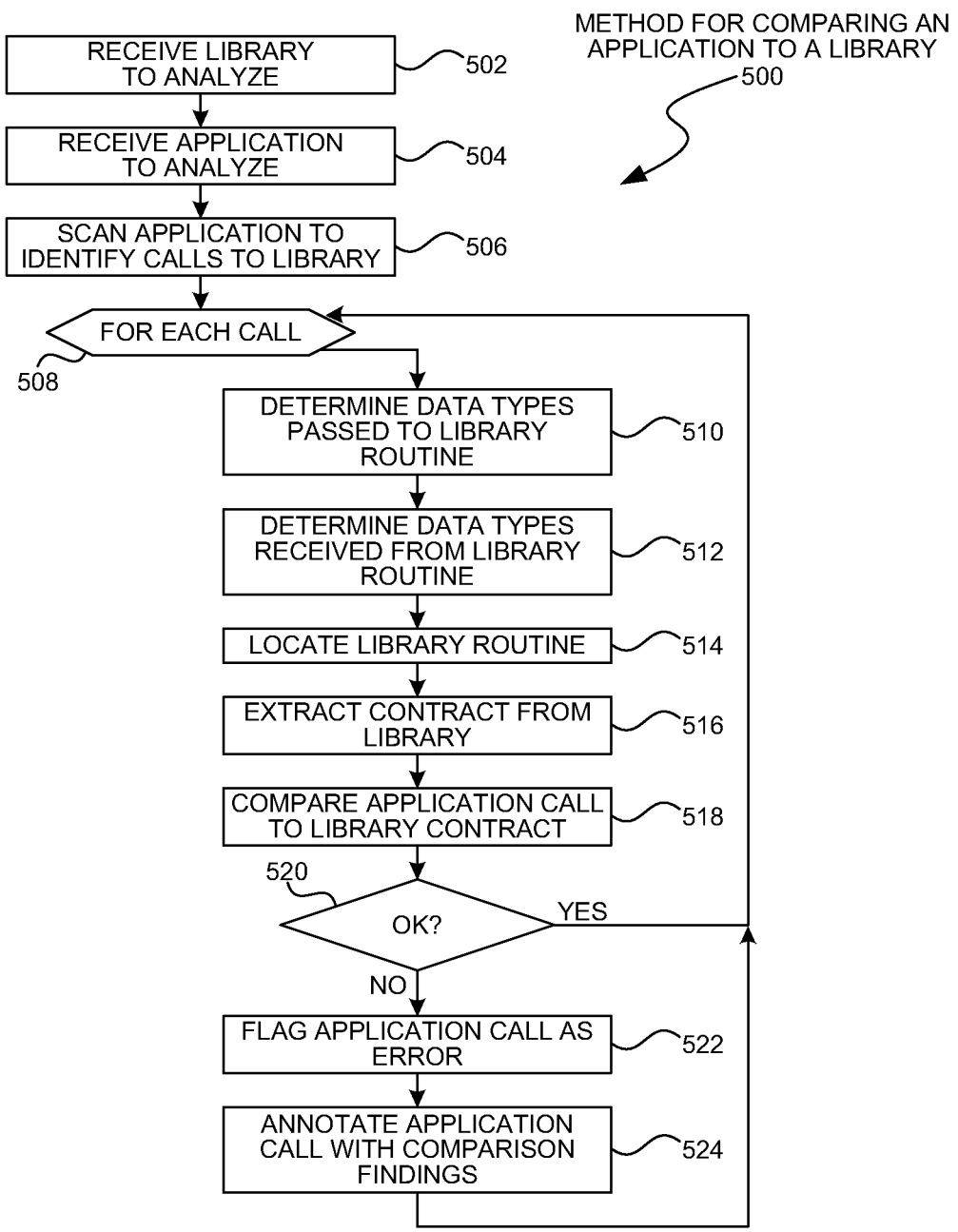
FIG. 5 is a flowchart illustration of an embodiment showing a method for comparing an application to a library.

FIG. 5 is a flowchart illustration of an embodiment 500 showing a method for comparing an application to a library. Embodiment 500 is a simplified example of a method that may compare an application to a library to identify routine calls that are compliant or not compliant with the library, and then annotate the application for a programmer.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 may represent a method that may be performed within a code development environment, where an application may be compared to a library. Because a library may use other libraries just like an application, the process of embodiment 500 may be used to compare a library against another library contract definition as well.

The library may be received in block 502 and the application received in block 504. The application may be scanned in block 506 to identify references from the application to routines in the library. The routine may be anything exposed from a library. For example, for procedural languages this may be simply functions which can be called, but for object oriented languages this may include a variety of concepts such as object creation, base class references, field access, method invocation, etc. All such references in any programming language can be modeled as a "routine" in the library with specific inputs as defined by the application and outputs as defined by the library. Each reference may be analyzed in block 508.

For each reference in block 508, the data types passed to the library routine may be identified in block 510 and data types received from the library routine may be identified in block 512.

The library routine may be located in block 514 and the contract for the routine extracted from the library in block 516. The library's contract and the reference from the application may be compared in block 518. If the contract satisfies the reference in block 520, the process may return to block 508.

If the contract does not satisfy the reference in block 520, the reference may be flagged as an error in block 524 and the reference may be annotated in block 526 with the comparison findings.

The annotations may be presented in a debugger, editor, or other output so that a programmer may examine and correct the application code.

Figure 6:
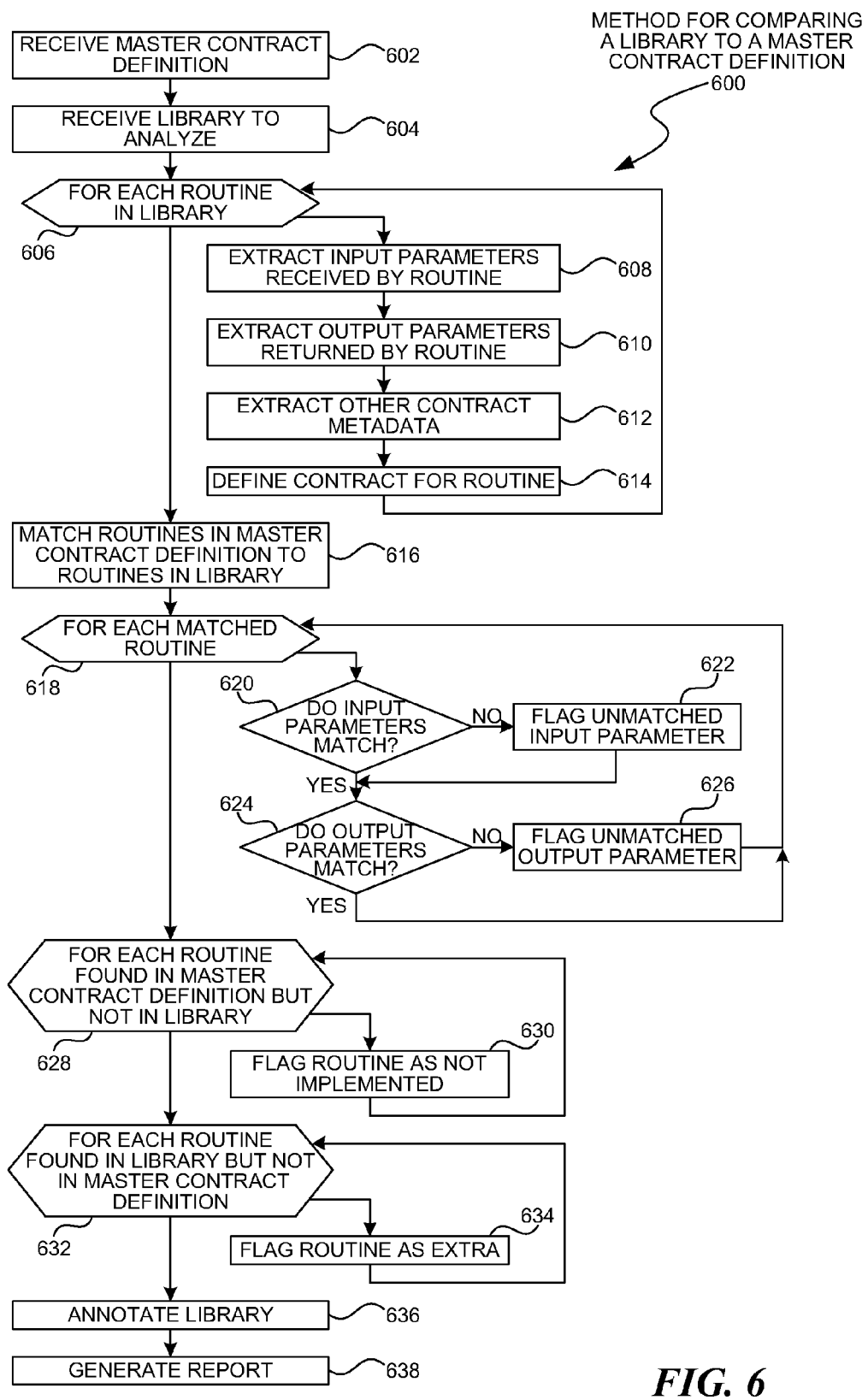
FIG. 6 is a flowchart illustration of an embodiment showing a method for comparing a library to a master contract definition.

FIG. 6 is a flowchart illustration of an embodiment 600 showing a method for comparing a library with a master contract definition. Embodiment 600 illustrates another comparison algorithm with some of the same operations as embodiment 500.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

In block 602, a master contract definition may be received, and a library may be received in block 604.

For each routine in the library in block 606, the input parameters received by a routine may be extracted in block 608, and the output parameters returned by the routine may be extracted in block 610. Any metadata related to the routine may be extracted in block 612. The contract for the routine may be defined in block 614 using the parameters passed to the routine and the parameters returned, as well as any metadata.

The operations of blocks 606 through 614 may be performed by a contract generator in some embodiments.

The routines in the master contract definition may be matched with the routines in the library in block 616. The matching in block 616 may result in three groups of routines: those that are common to both, those that are found in the master contract definition and not found in the library, and those that are found in the library but not in the master contract definition. The common routines may be considered the intersection between the libraries, while the other groups may be considered the differences between the libraries.

The common routine may be analyzed in block 618 to determine whether the contracts match. For each matched routine in block 618, if the input parameters do not match in block 620, the unmatched input parameter may be flagged in block 622. If the output parameters do not match in block 624, the unmatched output parameter may be flagged in block 626.

The routines found in the master contract definition but not in the library may be analyzed in block 628. For each routine in block 628, the routine may be flagged as not implemented in block 630.

The routines found in the library but not in the master contract definition may be analyzed in block 632. For each routine in block 632, the routine may be flagged as extra in block 634, or in some scenarios ignored.

The library may be annotated in block 636 with the various findings and a report may be generated in block 638.

The methods of embodiments 500 and 600 represent two different methods by which a conformity checker may be used to compare two different sets of code.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method for determining if an application is multi-platform compatible, said method performed on a computer processor, said method comprising:
   accessing a first version of a library for use on a first hardware platform, said first version of said library including first group of library routines, said first group of library routines representing a first implementation of a set of functionality for use at said first hardware platform, said set of functionality defined in a master contract definition, each of said routines in said first group of library routines indicating input data types used to call the routine and output data types that are returned from the routine at the first hardware platform;
   accessing a second version of said library for use on a second hardware platform, said second version of said library including second group of library routines, said second group of library routines representing a second implementation of said set of functionality for use at said second hardware platform, each of said routines in said second group of library routines indicating input data types used to call the routine and output data types returned from the routine at the second hardware platform;
   accessing an application, said application including one or more application routines configured to utilize at least a portion of said set of functionality defined in the master contract definition, said one or more application routines including one or more calls to library routines implementing said set of functionality; and
   determining that the application is compatible with both the first hardware platform and the second hardware platform by:
      identifying a set of common library routines that are included in both said first group or routines and in said second group of routines;
      identifying a set of differing library routines that are different between said first group of routines and said second group of routines;
      determining that said one or more application routines call library routines included in said set of common library routines; and
      determining that said one or more applications routines do not call library routines in said set of differing library routines.

2. The method of claim 1, wherein determining that the application is compatible with both the first hardware platform and the second hardware platform comprises performing at least one set operation selected from among a group composed of:
   difference;
   intersection; and
   union.

3. The method of claim 1, said first group of library routines being compiled.

4. The method of claim 3, said first group of library routines being compiled into an intermediate language.

5. The method of claim 1, each of said routines in said second set of library routines further comprising an implementation.

6. The method of claim 5, wherein
   a routine in said first group of library routines implements a first interface and is written in a first language; and
   another routine in said second group of library routines implements said first interface and is written in a second language.

7. The method of claim 5 wherein determining that the application is compatible with both the first hardware platform and the second hardware platform comprises generating an intersection between said first group of library routines and said second group of library routines, said intersection comprising said set of common library routines.

8. The method of claim 7 further comprising:
   decompiling said set of common library routines to define a master set of common library routines.

9. The method of claim 1, wherein said master contract definition is non-executable.

10. The method of claim 1 further comprising, annotating the application based on the determinations that said one or more application routines call library routines included in said set of common library routines and said one or more applications routines do not call library routines in said set of differing library routines.

11. A system for determining if an application is multi-platform compatible, said system comprising:
   a processor;
   a conformity checker, the conformity check configured to:
      access a first version of a library for use on a first hardware platform, said first version of said library including first group of library routines, said first group of library routines representing a first implementation of a set of functionality for use at said first hardware platform, said set of functionality defined in a master contract definition, each of said routines in said first group of library routines indicating input data types used to call the routine and output data types that are returned from the routine at the first hardware platform;
      access a second version of said library for use on a second hardware platform, said second version of said library including second group of library routines, said second group of library routines representing a second implementation of said set of functionality for use at said second hardware platform, each of said routines in said second group of library routines indicating input data types used to call the routine and output data types returned from the routine at the second hardware platform;
      access an application, said application including one or more application routines configured to utilize at least a portion of said set of functionality defined in the master contract definition, said one or more application routines including one or more calls to library routines implementing said set of functionality; and
      determine that the application is compatible with both the first hardware platform and the second hardware platform including:
         identify a set of common library routines that are included in both said first group or routines and in said second group of routines;
         identify a set of differing library routines that are different between said first group of routines and said second group of routines;
         determine that said one or more application routines call library routines included in said set of common library routines; and
         determine that said one or more applications routines do not call library routines in said set of differing library routines.

12. The system of claim 11 further comprising:
a compiler that receives source code and compiles said source code into intermediate code, said first group of library routines being defined in said source code.

13. The system of claim 12 further comprising:
a decompiler that receives said intermediate code and decompile said intermediate code into said source code.

14. The system of claim 13 further comprising:
a user interface that displays a portion of said first group of library routines and a portion of said second group of library routines.

15. The system of claim 14, said portion of said first group of library routines and said portion of said second group of library routines representing a difference between said first group of library routines and said second group of library routines.

16. A computer program product for use at a computer system, the computer program product for implementing a method for determining if an application is multi-platform compatible, said computer program product comprising one or more computer hardware memories having stored thereon computer-executable instructions that, when executed at a processor, cause the computer system to implement the method, including the following:

access a first version of a library for use on a first hardware platform, said first version of said library including first group of library routines, said first group of library routines representing a first implementation of a set of functionality for use at said first hardware platform, said set of functionality defined in a master contract definition, each of said routines in said first group of library routines indicating input data types used to call the routine and output data types that are returned from the routine at the first hardware platform;

access a second version of said library for use on a second hardware platform, said second version of said library including second group of library routines, said second group of library routines representing a second implementation of said set of functionality for use at said second hardware platform, each of said routines in said second group of library routines indicating input data types used to call the routine and output data types returned from the routine at the second hardware platform;

access an application, said application including one or more application routines configured to utilize at least a portion of said set of functionality defined in the master contract definition, said one or more application routines including one or more calls to library routines implementing said set of functionality; and determine that the application is compatible with both the first hardware platform and the second hardware platform by:
  identify a set of common library routines that are included in both said first group or routines and in said second group of routines;
  identify a set of differing library routines that are different between said first group of routines and said second group of routines;
  determine that said one or more application routines call library routines included in said set of common library routines; and
  determine that said one or more applications routines do not call library routines in said set of differing library routines.

17. The computer program product of claim 16 further comprising computer-executable instructions that, when executed, cause the computer system to:
annotate the application based on the determinations that said one or more application routines call library routines included in said set of common library routines and said one or more applications routines do not call library routines in said set of differing library routines.

18. The computer program product of claim 16 wherein computer-executable instructions that, when executed, cause the computer system to determine that the application is compatible with both the first hardware platform and the second hardware platform comprise computer-executable instructions that, when executed, cause the computer system to generate an intersection between said first group of library routines and said second group of library routines, said intersection comprising said set of common library routines.

19. The computer program product of claim 16 further comprising computer-executable instructions that, when executed, cause the computer system to:
decompiling said set of common library routines to define a master set of common library routines.

20. The computer program product of claim 19, wherein said master contract definition is non-executable.

* * * * *